(No Model.) 2 Sheets—Sheet 1.

R. WEIR.
CLOSED CONDUIT ELECTRIC RAILWAY.

No. 507,339. Patented Oct. 24, 1893.

WITNESSES:
Frank S. Ober
H. A. Offerman

INVENTOR
Robert Weir
BY Wm. A. Rosenbaum
ATTORNEY

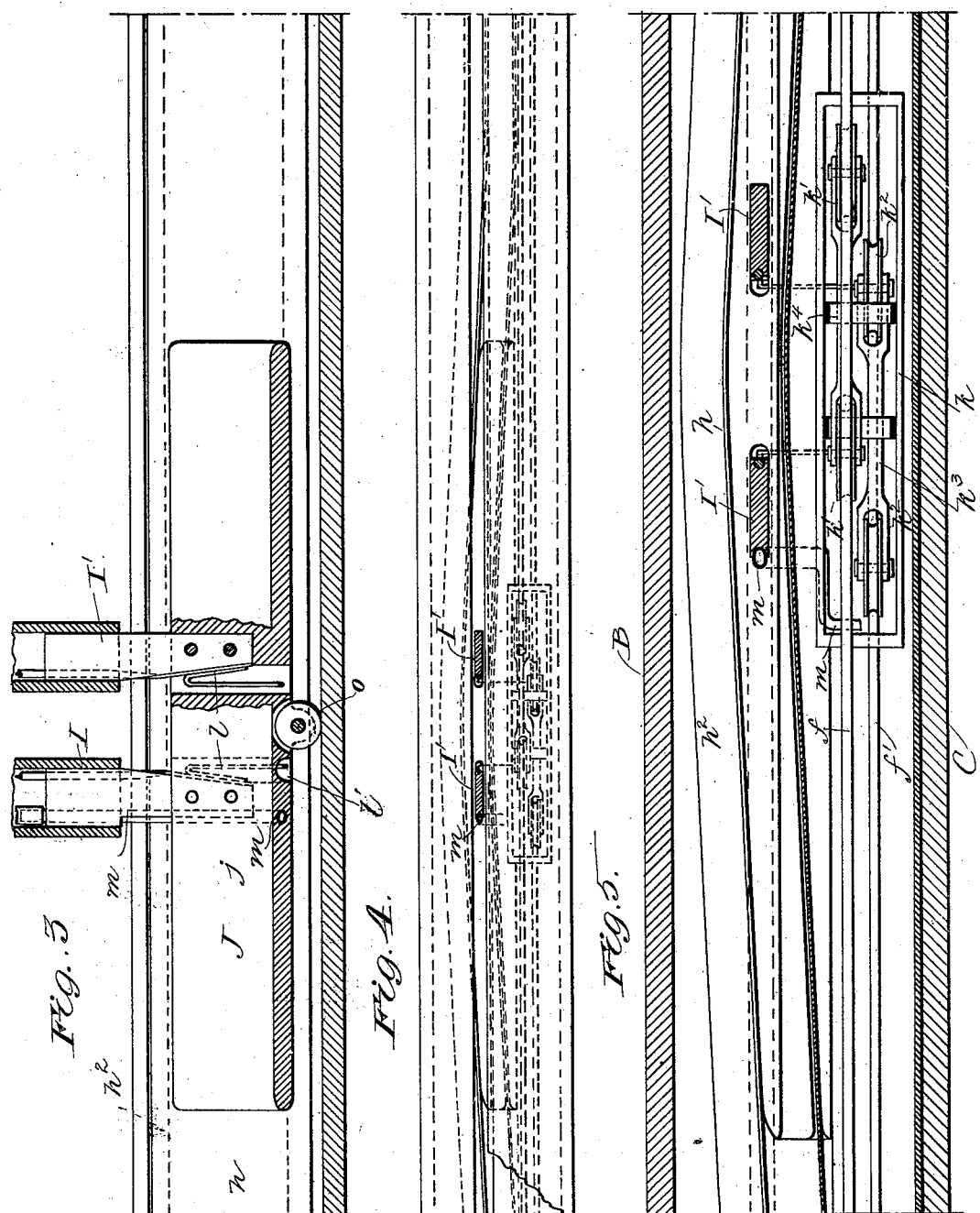

UNITED STATES PATENT OFFICE.

ROBERT WEIR, OF MONTCLAIR, NEW JERSEY.

CLOSED-CONDUIT ELECTRIC RAILWAY.

SPECIFICATION forming part of Letters Patent No. 507,339, dated October 24, 1893.

Application filed May 10, 1893. Serial No. 473,674. (No model.)

*To all whom it may concern:*

Be it known that I, ROBERT WEIR, a citizen of the United States, residing at Montclair, in the county of Essex and State of New Jersey, have invented certain new and useful Improvements in Electric Railways, of which the following is a full, clear, and exact description.

My invention relates to electric railways, and has special reference to those systems in which the feeding conductors are placed in a conduit in the ground between or adjacent to the rails upon which the vehicles travel.

The object of the invention is to provide a construction of conduit which will exclude all moisture and other foreign matter from the presence of the conductor or conductors, and in which the losses due to leakage will be correspondingly lessened.

A further object of the invention is to provide a conduit which may be made smaller in cross-section, simpler in construction, and therefore of less cost than those heretofore proposed.

In general terms, the invention consists of a conduit through which a plow or other collecting device carried by the moving vehicle passes, in combination with an auxiliary or supplemental conduit located inside of the first mentioned conduit, and being separated therefrom by a flexible wall or diaphragm which may be opened by and to admit the collecting device as it moves along the roadway, and which will automatically close after the passage thereof.

The invention also comprehends a similar flexible covering which normally covers the slot in the conduit through which the collecting device projects, but which is automatically removed and replaced upon the approach and recession of the car.

The invention also comprehends the specific details of construction all of which will be fully described and pointed out in the claims.

Figure 1:
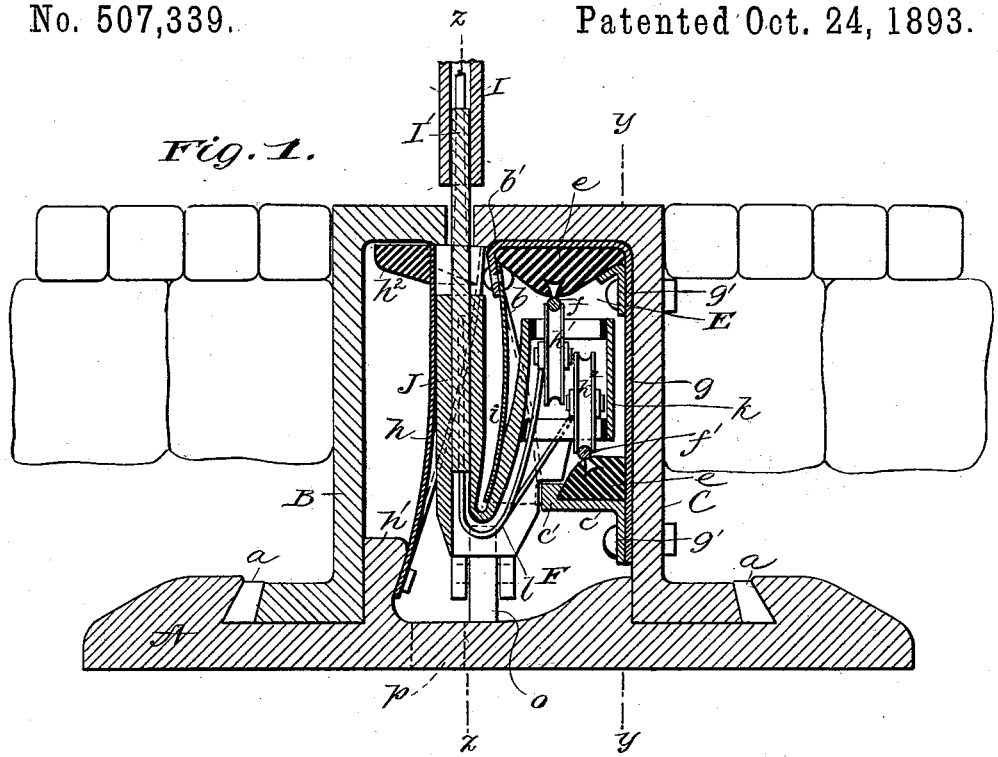
Figure 2:
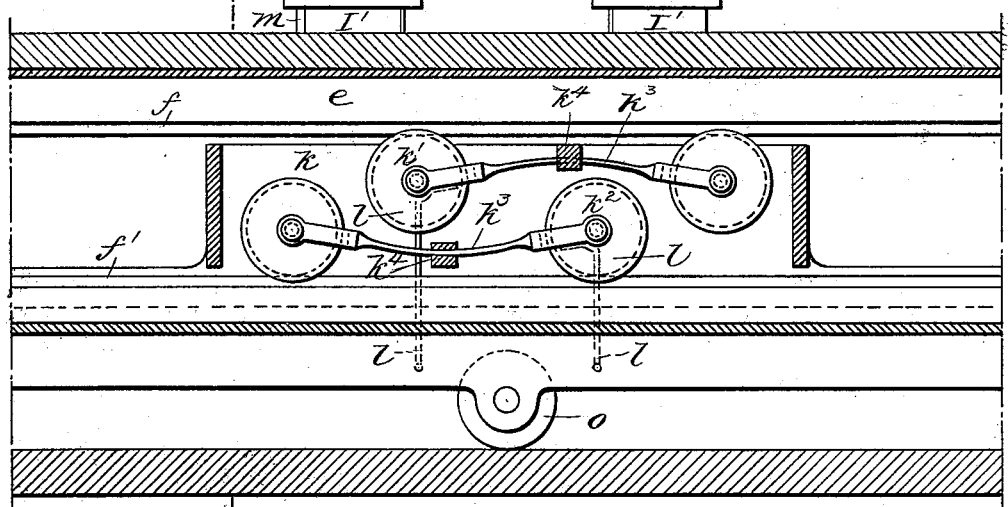

Referring to the accompanying drawings, Figure 1 represents a transverse section of the conduit and a collecting device placed therein, taken on line $x\,x$ of Fig. 2. Fig. 2 is a longitudinal section of the same apparatus, taken on line $y\,y$ of Fig. 1; the end of the collecting device or shoe being removed. Fig. 3 is a longitudinal section of the apparatus, taken on line $z\,z$ of Fig. 1, and made on a small scale. Fig. 4 is a plan of the conduit, showing the apparatus and collecting device in dotted lines; and Fig. 5 is a plan on a larger scale with the top plate of the conduit removed.

Referring to the drawings by letter, the conduit proper is made up of three principal parts which may be of metal, cast or otherwise formed. These three parts are: first, the bed plate A provided with longitudinal grooves on its upper face, and the two pieces B and C constituting the sides and top of the conduit. These last mentioned pieces have horizontal flanges at their lower edges which rest in the grooves in the bed plate and are held therein by means of keys $a$ which are wedged in tightly to hold the two upright parts rigidly in place. This forms a very simple construction of conduit, requiring very little work to put it together or take it apart, as no bolts or rivets are used. It is better than a single casting, because parts may be removed without disturbing other parts and thus repairs may be made at small expense. The interior of the conduit is divided into two longitudinally continuous chambers by means of a partition $b$. This partition consists of a flexible flap or diaphragm of sheet steel or other suitable material $b$ fixed along its upper edge by means of rivets or otherwise to a suitable projection $b'$ from the roof of the conduit. The lower edge of this flap is perfectly free and rests normally against the lip $c'$ on the ledge $c$. The ledge and the flap form continuous tight structures which effectually separate the conduit into two compartments E and F, respectively. To the roof and floor of the compartment E I attach insulating devices $e$, such as a continuous length of fiber, rubber, porcelain, or other material to which are attached in any suitable manner two electrical conductors $f, f'$. If desired, these insulators may not be continuous, but may consist of knobs or blocks placed at intervals, the only necessary feature being that they shall be well supported and thoroughly insulated from their supports. For the sake of convenience in building, these insulators and the parts $b$ and $c$ are secured to a metallic lining $g$ which is fastened in the upper corner of the conduit by means of bolts $g'$, in the manner shown.

In the compartment F of the conduit into which the slot at the surface opens, I place another flexible flap, sheet, or plate $h$. This is fixed securely along its lower edge to a shoulder $h'$ at some portion of the conduit, and carries at its upper end a strip of soft valve rubber or other flexible material $h^2$. The normal position of this flap is shown in dotted lines in Fig. 1, and in this position the slot in the conduit is closed by the rubber strip and sand, gravel, and other foreign matters are thus excluded from the conduit. This flap may rest against the lug $b'$ or any other stop provided for the purpose. Instead of being a continuous plate, the flap may be built up of a series of vertical strips; it may have any construction, in fact, which will permit of the rubber strip being moved to one side and returned to its normal position, in the manner hereinafter described.

The collecting device which takes the current from the conductors and carries it to the vehicle is supported by the vehicle through two hollow arms I, I. These arms are supported rigidly upon the car and each embraces a plate $I'$ which projects through the slot into the conduit. These plates are arranged to slide vertically in the hollow arms, so that irregular movements of the car may not be transmitted to the collecting device. The plates $I'$ are bolted rigidly to the middle portion of an elongated shoe or shuttle J. This shuttle in cross-section is nearly V-shaped; one side standing in a vertical plane and the other being inclined thereto. The vertical portion $j$ has two passages or chambers formed in it in which the ends of the plate $I'$ are fixed. The entire shoe is preferably made in one solid piece, although if found desirable it may be composite. The inner side of the vertical portion is substantially parallel to the sides of the conduit, while the outer side is curved gradually from its ends outward toward the middle part where it is the thickest. This curved side therefore, forms a kind of elongated cam, an inside view of which is shown in Fig. 3. The other half or arm of the shoe connects with the vertical half along its entire lower edge thus forming a deep groove $i$ between the two parts. The extremities of the inclined half are not as high as the vertical half, but the middle portion of the inclined half reaches upward almost as high as the vertical half. The inner wall of the inclined half which stands adjacent to the flat wall of the vertical half is bulged inward toward the flat wall at the middle portion and recedes therefrom toward its extremities so that it is nearly parallel with the curved outer wall of the vertical half. The outer wall of the inclined half may be substantially flat, as it plays no part in the operation of the device. To the outer side of the inclined wall is fixed a rectangular frame $k$ in which are mounted two pairs of collecting wheels $k'$, $k^2$, respectively. Each pair of wheels is carried at the opposite ends of a spring bar $k^3$ which is fixed to a cross-piece $k^4$ in the frame at its middle point. The two pairs of wheels are adapted to bear respectively against the upper and lower conductors $f$, $f'$, and when adjusted to this position, the spring bars $k^3$ are held under tension thus forcing the wheels against the conductors with a yielding pressure. Each pair of wheels is electrically connected with a plate $I'$ by means of its conductor $l$ which passes from the wheels downward beside the inclined arm through a groove $l'$ in the lower edge of the shoe into which the plate $I'$ projects. The end of the conductor shown in Fig. 3 rests freely against the edge of the plate, so that it will make a rubbing contact therewith whenever there is a difference of motion between the end of the conductor and the shoe. In connection with one of the plates $I'$, there is also a tube $m$ which passes from the car down through the sleeve I and through the passage in the shoe in which the plate $I'$ is fixed; it is then bent and passed through an opening in the lower part of the shoe and up into the frame $k$ supporting the wheels where its open end is located. This tube is to convey air under pressure, as will hereinafter be described.

In order to support the weight of the shoe in the conduit and to partially balance it, I sometimes prefer to put on a wheel $o$ which is mounted in bearings under the center of the shoe, as shown. This wheel rolls along the bottom of the conduit. It may also be found desirable to place a brush at one or both ends of the shoe which shall drag along in the conduit and clear away water and other foreign substances which may by accident get into it—these brushes, however, do not constitute a part of my invention, and they may be carried entirely separate from the shoe if desired. The bottom of the conduit is perforated at various points, as indicated in dotted lines in Fig. 1 at $p$, to connect with a sewer which will carry off water or other materials forced or falling into it.

The operation of the system is as follows: At some convenient point in the road, the shoe carrying the collecting device is adjusted in the conduit in the position shown in Fig. 1—that is to say, the inclined half of the shoe carrying the collecting wheels and the rectangular frame are passed up under the flap $b$ and into the compartment of the conduit containing the conductors. The two pairs of wheels are then adjusted respectively to the two conductors so that one will make an under contact and the other an over contact, as shown. The car is then connected with the shoe by passing the sleeves I, I down over the plates $I'$. The vertical portion of the shoe will then be directly under the slot. To get the parts of the shoe into this position it is necessary to swing the flap $b$ outward away from the lip $c'$ of the bracket $c$ and to swing the flap $h$ to one side, thus uncovering the slot. The current is taken from one conductor through a pair of collecting wheels, thence through the flexible conductor in the shoe to a plate $I'$, to the motor on the car, then back to the other plate I', through the flexible conductor connected therewith, to the other pair of collecting wheels and the other conductor. As the car moves along over the road, the two curved or cammed surfaces of the shoe act respectively on the flap $b$ and the flap $h$ and swing them outward, thus making way for the shoe to travel. After the shoe passes, the flaps return to their normal position by the resiliency of the material of which they are made, and the compartments containing the conductors and the slot are effectually closed. This outward movement of the flaps caused by the shoe as it travels along is a gentle wave-like motion which is a very easy motion for the flaps and which does not tend to strain them in any way. By constant use, however, they may be caused to buckle or warp slightly, and to prevent this, I prefer to form the flaps in long overlapping sheets, instead of one continuous sheet. The overlapping ends will not be rigidly fastened together, but may move upon each other to a slight extent, thus preventing any strain which might cause the said buckling. The air tube $m$ may or may not be used, but it will be found desirable at times to force air into the compartment E for the purpose of drying and blowing out dust which might gather. It will be understood, of course, that my system is not confined to two conductors; one conductor may be used with exactly the same shoe, the return circuit being through the rails in the ordinary manner. The conductors, whether one or two are used, are in the nature of rails to help support and guide the shoe through the conduit. The rubber strip $h^2$ used to close the slot may be made of the material known as valve rubber, as this is very durable and is not seriously affected by moisture.

I do not confine myself to the details of the invention herein described as it is obvious that many modifications thereof may be utilized without departing from the spirit and principle involved. The shoe may be of metal or any suitable insulating material. It is also pointed out that the cars may be equipped with a brush which will precede the arms I, I, and clear out the slot before the strip $h^2$ is moved aside.

Having thus described my invention, I claim—

1. A railway conduit divided into compartments by a flexible flap or diaphragm occupying a substantially vertical position, said diaphragm being fixed at the upper edge and free at the lower edge, and electrical conductors located in one of the compartments, in combination with a collecting device carried by the car and having a branching arm extending under the lower edge of the flap and into the compartment in which the conductors are located, said arm provided with a cam for distorting or bending the flap to admit the collecting device, for the purpose set forth.

2. A railway conduit divided into compartments by a flexible flap or diaphragm occupying a substantially vertical position, said diaphragm being fixed at the upper edge and free at the lower edge, electrical conductors located in one of the compartments, and mechanism carried by moving vehicles and running in contact with said conductors.

3. A railway conduit divided into compartments by a flexible flap or diaphragm occupying a substantially vertical position, said diaphragm being fixed at the upper edge and free at the lower edge, and electrical conductors located in one of the compartments, in combination with a collecting device carried by the car, adapted to distort said diaphragm to gain access to the conductors, substantially as described.

4. In a railway conduit having a slot, a slot closing device consisting of a closing head or strip supported from below by a flexible flap, said flap being fixed at its lower edge and free at its upper edge, in combination with a cam carried by the vehicle and adapted to distort or curve it to one side to open the slot, substantially as described.

5. In a railway conduit two flexible flaps, one inclosing the conductors and the other covering the slot in the conduit, in combination with a collecting device carrying two cams, one to open the flap inclosing the conductors and the other to uncover the slot, substantially as set forth.

6. A collecting device attached to a car and moving in a conduit, consisting of two elongated flat portions joined together along one edge and inclined to each other to form a V-shaped cross-section, one portion having a cam formed upon it and provided with a collecting device, in combination with a depending flap covering the electrical conductors with which said cam is adapted to engage, the flap sliding through the opening between the two portions and permitting access of the collecting device to the conductors as the car moves along.

7. A conduit built up of three main parts, a horizontal base piece having grooves in its upper surface and two rails forming the sides and top of the conduit, the rails being held in the grooves of the base by keys, in the manner and for the purpose set forth.

8. In an electric railway system, a conduit having a closed compartment containing the conductors, in combination with a collecting device carried by a moving vehicle, said collecting device adapted to open the closed compartment as it moves along, and an air blast supply carried by the car and directed into the closed compartment, substantially as described.

In testimony whereof I subscribe my signature in presence of two witnesses.

ROBERT WEIR.

Witnesses:
 FRANK S. OBER,
 WM. A. ROSENBAUM.